United States Patent Office 3,211,670
Patented Oct. 12, 1965

3,211,670
PROCESS OF MAINTAINING THE ACTIVITY AND OF REGENERATING THE ACTIVITY OF USED OR SPENT ACID ACTIVATED MONTMORILLONITE CATALYST
Harry Kaplan, Westfield, John A. Hodgkiss, Edison, and Titus Z. Trzaskowski, West Orange, N.J., assignors to General Aniline & Film Corporation, New York, N.Y., a corporation of Delaware
No Drawing. Filed Apr. 16, 1964, Ser. No. 360,413
9 Claims. (Cl. 252—414)

This application is a continuation-in-part of our application Serial No. 53,911, filed on September 6, 1960, and now abandoned.

The present invention relates to an improved process of maintaining the catalytic activity as well as regenerating used or spent acid-activated montmorillonite type catalyst and particularly catalysts of this type employed in the alkylation of phenolic compounds.

The alkylation of phenolic compounds by several methods is well known. Several substances and mixtures of such substances have been proposed as alkylation catalyst such as, for example, sulfuric acid, phosphoric acid, hydrofluoric acid, metal phosphates, and particularly acid clays of various types. Of commercial interest are alkylated phenols which are ethoxylated and used in the manufacture of surface active agents. The alkylated phenolic compounds prepared in accordance with the present invention are obtained commercially acceptable procedure while employing olefinic hydrocarbons as the alkylating agents in the presence of acid clays, especially acid-activated montmorillonite types. The acid activation or acid pre-treatment is usually effected by but not necessarily restricted to known processes such as are employed in the manufacture of decolorizing clays. Normally, the acid treatment (cold) is carried out on the mineral montmorillonite (bentonite), an aluminum hydrosilicate, in finely divided form while the mineral clay is suspended in water in the form of a slurry to which mineral acid such as hydrochloric or sulfuric acid is added or dilute mineral acid added directly to the finely divided mineral clay. In either case, the weight ratio of cold acid to dry mineral clay may vary from about 20 to 100% based on the anhydrous basis but preferably the ratio is in the order of 30–40%. The mixture of the mineral clay and acid is heated to about 160° to 210° F. for a period of time ranging from 2 to 12 hours and thereafter water washed and filtered. Acid treatments of montmorillonite types of clay are described in United States Patents 1,397,113; 1,579,326; 1,642,871 and many others too numerous to mention, all of which are known to those skilled in the art. The acid treated clay after drying in any known or desired manner is then formed into aggregate masses such as by granulating, powdering, molding, extruding and the like and utilized as catalysts in the alkylation of phenols with olefinic hydrocarbons.

The solid type acid clay catalyst generally employed in the alkylation of phenolic compounds, while utilizing olefinic hydrocarbons as the alkylating agents, is activated bentonite catalyst in powder form, produced by acid treatment of the montmorillonite type mineral. The mineral montmorillonite, known commercially as bentonite, is best described by the following excerpts from "The Chemistry and Physics of Clays," by A. B. Searle and R. W. Grimshaw (Interscience Publishers, Inc.):

"Montmorillonite is the name given to a clay mineral found near Montmorillon in France as long ago as 1874. Essentially it has the composition $$Al_2O_3 \cdot 4SiO_2 \cdot H_2O + xH_2O$$

and is of exceptional stickiness. Many other minerals of similar properties yet with widely differing chemical composition have since been discovered.

"X-ray analyses have established the structural similarities and it is now known that extensive substitution and replacements can take place within the lattice.

"A wide range of minerals exists which might be included in the 'montmorillonite group,' but the term *montmorillonite* now has a more restricted meaning, and implies a compound which is essentially a hydrated aluminasilicate with only little substitution.

"Many clays which contain montmorrillonite type minerals have been termed bentonite. The name has become common usage for commercial grades of montmorillonites."

The naturally occurring aluminum hydrosilicates of the montmorillonite type which have been subjected to a cold acid treating process are currently employed as catalysts for the alklation of phenolic compounds because of their high ion exchange capacity at low reaction temperatures. Because of the high activity of these phenol alkylation catalysts a conversion above 90% is achieved even at temperatures between 80° and 90° C. while employing olefinic hydrocarbons from 3 to 25 carbon atoms. With di-mono-olefin such as di-n-butenes, temperatures between 100° and 130° C. may be employed with satisfactory results. With shorter carbon chain olefins such as butene, higher temperatures such as 150° C. may be required.

In the alkylation of phenolic compounds with olefinic hydrocarbons as currently practiced, while employing acid activated catalysts of the silica-alumina type at temperatures described above, the catalyst after each alkylation run is weakened to the extent that the yield of the alkylated phenolic compound drops progressively after each run. In other words, if the same catalyst is reused, say for 5 or 6 times, the yield drops from 90 to 60%. To maintain the desired yields of the alkylated phenolic product, it has been customary to add after the second or third alkylation run fresh catalyst or to remove part of the used catalyst and replace it with fresh catalyst. Such procedure results in the dumping of the catalyst after it no longer gives economical yields. To maintain the catalytic activity without replacement of the used or spent catalyst with fresh catalyst and finally dumping the spent catalyst is the current problem confronting the chemical industry engaged in the alkylation of phenolic compounds.

It is the principal object of the present invention to provide a method of maintaining catalyst activity as well as regenerating used or spent acid activated catalysts of the silica-alumina type while overcoming the foregoing shortcomings.

Another object of the present invention is to provide a simple, efficient and inexpensive method of regenerating used silica-alumina catalysts such as acid activated bentonite catalysts including synthetic absorbent composites of silica-alumina employed in the alkylation of phenolic compounds.

Other objects and advantages will become more clearly manifest from the following description.

We have found that alkylation catalysts of the silica-alumina type such as, for example, acid activated montmorillonite catalysts, acid activated bentonite catalysts, synthetic adsorbent composites of silica-alumina, fuller's earth, and all of the other acid treated silica-alumina catalysts which are commercially available under various brand names from the several manufacturers of such alkylation catalysts including the Chemical Products Division of the Chemetron Corporation, the Houdry Process Corporation, and the Harshaw Chemical Company, are readily, efficiently and economically regenerated by treating the catalyst, after several alkylating runs and particularly after a run wherein the yield has dropped to about 60–70%, with an olefinic hydrocarbon of from 3 to 25 carbon atoms in the form of a slurry under conditions ranging from ambient temperatures to 200° C. By such treatment the alkylation yields obtainable from the use of the regenerated catalyst return to the range of yields obtained with fresh catalyst.

The alkylation catalysts of the silica-alumina type which are very readily regenerated in accordance with our process are the activated mineral clay montmorillonites (bentonite) which show substantially the following chemical analysis:

| | Percent |
|---|---|
| Al | 7.66 |
| Si | [1] 31 |
| Fe | 6.4 |

[1] 66.21% as $SiO_2$.

with or without the presence of small amounts of magnesium and calcium as shown by emission spectrographic analysis. With this type of catalyst, as well as with other types of the aforementioned silica-alumina catalysts, regeneration is readily accomplished after the initial catalyst no longer produces a commercially acceptable yield.

The foregoing regeneration procedure prolongs the life of the silica-alumina type catalysts while maintaining production of the alkylated phenolic compounds in good yields and of high quality.

The phenolic compounds which are normally alkylated while employing acid activated catalysts of the silica-alumina type include phenol per se, o-, m- and p-cresol, 2,4-xylenol, α-, and β-naphthol, 5-anthrol, 2-pyrocatechol, resorcinol, pyrogallol, phloroglucinol, 1,2-dihydroxynaphthalene and the like. As alkylating agents, nonadecene, eicosene, docosene, tetracosene, pentacosene, propylene, dipropylene, butylene, isobutylene, diisobutylene, pentene, hexene, octene, nonene, decene, undecene, dodecene, octadecene, and the like are employed while utilizing the aforementioned temperatures. The alkylation reaction is normally conducted in a closed vessel equipped with agitation, thermometer and condenser. The vessel is charged with the phenolic compound, the olefinic hydrocarbon in a 1:1 mole ratio or, if desired, with a molar ratio in excess of or deficient of that of the phenolic compound. The mixture is then heated at a temperature of 70–150° C. depending upon the number of carbons in the olefinic hydrocarbon, preferably with lower temperatures as noted above being employed for the longer carbon chain olefins and higher temperatures being employed for the shorter carbon chain olefins. The acid activated silica-alumina type catalyst may range from 0.1 to 10 parts by weight per 10 parts of the phenolic compound. After the alkylation reaction has been completed, which may take from ½ to 10 hours, the catalyst is removed by filtration and the filtrate is fractionated at reduced pressure through a conventional distillation column to give the alkylated phenolic compound.

It is to be noted that the position of the unsaturation in the olefins of from 3 to 25 carbon atoms, employed both as alkylating agents and as regenerating agents in accordance with the present invention, is immaterial. It is well recognized that industrially available polypropylenes are mixtures of several theoretically possible isomers rather than of a single one. Commercial nonene (tripropylene), for example, is made by polymerizing nonene and then isolating the desired product by fractional distillation. Cuts are then taken corresponding to the successively greater incremental polymers of propylene. The nonene thus produced is a mixture of eight possible isomers. Similar situations pertain to the higher polymers. Likewise, because of the processing employed, the so-called linear olefins are mixtures of the several chain lengths averaging to the nominal length and, within each such length, a mixture of the possible position isomers. In addition, during the alkylation reaction, the double bond tends to migrate so that even if we begin with a pure position isomer of an olefin with an unsaturation in the 1-, 2-, etc., positions, the resulting alkylphenol is a mixture of products deriving from several position isomers.

In the following examples, therefore, when reference is made to a specific olefin or alkylphenol, it is to be understood that these isomeric possibilities are included.

In the practice of our invention, the used catalyst is recovered from an alkylation mixture by filtration, centrifuging, settling or the like. Such recovered catalyst is regenerated by admixing the catalytic solids with from one to one hundred parts by weight of an olefin hydrocarbon of from 3 to 25 carbon atoms and contacting the spent or partially spent catalyst with the olefin, at temperatures ranging from ambient to 200° C., and for a length of time sufficient to restore the catalyst to a commercially acceptable level of activity. Our preferred operating range is within the temperature limits of 30° C. to 150° C., using from two to ten parts by weight of regenerating olefin of from 3 to 25 carbon atoms for each part of the catalyst to be regenerated; generally contact time of one-half hour to five hours will suffice for the regeneration under these conditions. The reactivated catalyst, if in a slurry, can be conveniently separated by filtration or the like. It is not necessary to remove the residual olefin from the regenerated catalyst cake. The recovered, reactivated, catalyst cake can be either dried or used as such. In fixed bed operations, the regenerating olefin can be displaced by the actual alkylating admixture or one or more components thereof, or by air or nitrogen or other inert gas. Particularly for fixed bed operations, the preferred regenerating olefin is the alkylation mixture or components thereof.

For a further and more specific understanding of the present invention, reference is given to the following examples: All parts given are by weight.

*Example I*

Into a 1-liter 3-necked flask equipped with agitator, thermometer and condenser were charged 188 parts of U.S.P. phenol (2 moles) 126 parts of 2-nonene (1 mole) and 18.8 parts of the acid treated mineral montmorillonite (bentonite), commercially available from Chemical Products Division of Chemetron Corporation under the brand name of KSF, activated montmorillonite catalyst. The mixture was heated at 70° C. with agitation for a period of 5 hours. The catalyst was removed by filtration and amounted to 27 parts as a wet filter cake. The filtrate was fractionated at 10 mm. pressure through a laboratory Vigreaux column providing 17 theoretical plates to yield 202.8 parts of nonylphenol distilling over the range of 159° to 18° C. The yield was 92.2%.

The catalyst recovered in the manner stated above was employed in 5 successive repetitions of the foregoing alkylation procedure, employing in each repetition 188 parts of U.S.P. phenol and 126 parts of 2-nonene, the catalyst employed in each case being that recovered in the preceding repetition. The results of these five repetitions are as follows:

| Repetition | Parts of wet filter cake catalyst | Parts of nonylphenol | Percent yield |
|---|---|---|---|
| 1 | 27 | 199 | 90.5 |
| 2 | 26 | 179 | 81.5 |
| 3 | 25.5 | 162 | 73.5 |
| 4 | 25 | 156 | 71 |
| 5 | 24 | 149 | 67.5 |

The catalyst cake as recovered by filtration from repetition 5 was slurried in 200 parts of 2-nonene. The slurry was heated under reflux for 1 hour and the catalyst filtered off. There were recovered 16 parts of substantially dry catalyst cake.

Example I was again repeated with the exception that 18.8 parts of the original dry catalyst were replaced by 16 parts of the above nonene-treated catalyst. There were obtained 196 parts of nonylphenol distilling over the range of 159° to 181° C. at 10 mm. pressure having a refractive index $n_D^{25}$ of 1.5110. The yield was 89%.

Example II

Into a 1-liter 3-necked flask equipped with agitator, thermometer and condenser were charged 188 parts of U.S.P. phenol (2 moles), 126 parts of 1-nonene (1 mole) and 18.8 parts of activated montmorillonite catalyst purchased under the brand name of K10. The mixture was heated at 70° C. with agitation for a period of 5 hours. The catalyst was removed by filtration and amounted to 26 parts as a wet filter cake. The filtrate was fractionated at 10 mm. pressure through a laboratory Vigreaux column providing 17 theoretical plates to yield 207 parts of 1-methyloctylphenol distilling over the range of 162 to 187° C. at 10 mm. pressure and having a refractive index of $n_D^{25}$ of 1.5032. The yield was 94%. The catalyst recovered in the manner stated above was employed in five successive repetitions of the alkylation procedure of Example II, employing in each repetition 188 parts of U.S.P. phenol and 126 parts of 1-nonene, the catalyst employed in each case being that recovered in the preceding repetition. The results of these five repetitions are as follows:

| Repetition | Parts of wet filter cake catalyst | Parts of 1-methyloctyl-phenol | Percent yield |
|---|---|---|---|
| 1 | 26.5 | 198 | 90 |
| 2 | 26 | 180 | 82 |
| 3 | 24.5 | 165 | 75 |
| 4 | 24 | 156 | 71 |
| 5 | 23 | 145 | 66 |

The catalyst cake as recovered by filtration from repetition five of Example II was slurried in 200 parts of 2-nonene. The slurry was agitated for 5 hours at 30° C. and the catalyst filtered off. There were recovered 16.5 parts of dry catalyst cake.

Example II was again repeated with the exception that 18.8 parts of the original catalyst were replaced by 16.5 parts of the above nonene-treated catalyst. There were obtained 198 parts of 1-methyloctylphenol distilling over the range of 162° to 187° at 10 mm. pressure and a refractive index $n_D^{25}$ of 1.5032. The yield was 90%.

Example III

Into a 1-liter 3-necked flask equipped with agitator, thermometer and condenser were charged 235 parts of U.S.P. phenol (2.5 moles), 84 parts of 1-dodecene (0.5 mole) and 23.5 parts of activated montmorillonite purchased under the brand name of K10SF. The mixture was heated at 90° C. with agitation for a period of 5 hours. The catalyst was removed by filtration and amounted to 36 parts as a wet filter cake. The filtrate was fractionated at 10 mm. pressure through a laboratory Vigreaux column providing 17 theoretical plates to yield 241 parts of dodecylphenol distilling over the range of 178° C. to 220° C. at 10 mm. and having refractive index $n_D^{25}$ of 1.5070. The yield was 92%.

The catalyst removed in the manner stated above was employed in five successive repetitions of the alkylation procedure of Example III, employing in each repetition 235 parts of U.S.P. phenol and 84 parts of dodecene, the catalyst employed in each case being that recovered in the preceding repetition. The results of these five repetitions are as follows:

| Repetition | Parts of wet filter cake catalyst | Parts of dodecyl phenol | Percent yield |
|---|---|---|---|
| 1 | 36 | 233 | 89 |
| 2 | 35 | 219 | 83.5 |
| 3 | 33.5 | 211 | 80.5 |
| 4 | 33 | 202 | 77 |
| 5 | 31 | 195 | 74.5 |

The catalyst cake as recovered by filtration from repetition five of Example III was slurried in 250 parts of 1-dodecene and the slurry heated under reflux for 1 hour and the catalyst filtered off. There were recovered 22 parts of dry catalyst cake.

Example III was again repeated with the exception that 23.5 parts of the original catalyst were replaced by 22 parts of the dodecene-treated catalyst. There were obtained 236 parts of dodecylphenol distilling over the range of 178° to 220° C. at 10 mm. pressure and of refractive index $n_D^{25}$ 1.5070. The yield was about 90%.

Example IV

Into a 1-liter 3-necked flask equipped with agitator, thermometer and condenser were charged 324 parts of U.S.P. cresol (3 moles), 168 parts of 1-dodecene (1 mole) and 32.4 parts of acid clay catalyst obtained under the brand name of "Harshaw Silica Catalyst." The mixture was heated at 85° C. with agitation for a period of 5 hours. The catalyst was removed by filtration and amounted to 47 parts as a wet filter cake. The filtrate was fractionated at 10 mm. pressure through a laboratory Vigreaux column providing 17 theoretical plates to yield 256 parts of dodecyl cresol distilling over the range of 205° to 220° C. at 10 mm. and having a refractive index $n_D^{25}$ of 1.5095. The yield was 93%.

The catalyst cake recovered in the manner stated above was employed in five successive repetitions of the alkylation procedure of Example IV, employing in each repetition 324 parts of U.S.P. cresol and 168 parts of 1-dodecene, the catalyst employed in each case being that recovered in the preceding repetition. The results of the five repetitions of Example IV are as follows:

| Repetition | Parts of wet filter cake catalyst | Parts of dodecyl cresol | Percent yield |
|---|---|---|---|
| 1 | 47 | 251 | 90 |
| 2 | 45.5 | 237 | 86 |
| 3 | 44 | 220 | 80 |
| 4 | 43 | 212 | 77 |
| 5 | 42 | 201 | 73 |

The catalyst cake as recovered by filtration from repetition 5 of Example IV was slurried in 400 parts of 1-dodecene. The slurry was heated at a temperature of 75° C. for 1 hour and the catalyst filtered off. There were recovered 30.5 parts of dry catalyst cake.

Example IV was again repeated with the exception that 32.4 parts of the original catalyst were replaced by 30.5 parts of the 1-dodecene treated catalyst. There were obtained 248 parts of dodecyl cresol distilling over the range of 205° C. to 220° C. at 10 mm. pressure and of refractive index $n_D^{25}$ of 1.5095. The yield was 90%.

Example V

A. Into a 1-liter 3-necked flask equipped with agitator, thermometer and condenser were charged 188 grams of U.S.P. phenol (2 moles), and 244 parts of diisobutylene (2 moles) and 18.8 parts of acid clay catalyst obtained under the brand name of "Harshaw Silica Catalyst." The mixture was heated at 75° C. with agitation for a period of 4 hours. The catalyst was removed by filtration and amounted to 28 parts as a wet filter cake. The filtrate was fractionated at 15 mm. pressure through a laboratory Vigreaux column providing 17 theoretical plates to yield 200 parts of diisobutyl phenol distilling over the range of 163° to 182° C. at 15 mm. and having an S.P. of 62° C.

The catalyst cake recovered in the manner stated above was employed in five successive repetitions of the alkylation procedure of Example V, employing in each repetition 188 parts of U.S.P. phenol and 244 parts of diisobutylene, the catalyst employed in each case being that recovered in the preceding repetition. The results of the five repetitions are as follows:

| Repetition + | Parts of wet filter cake catalyst | Parts of diisobutyl phenol | Percent yield |
| --- | --- | --- | --- |
| 1 | 28 | 188 | 91.5 |
| 2 | 26.5 | 177 | 86 |
| 3 | 25.5 | 169 | 82 |
| 4 | 24 | 161 | 78 |
| 5 | 23 | 153 | 74 |

The catalyst cake as recovered by filtration from repetition 5 of Example V was slurried in 250 parts of diisobutylene and the slurry heated at a temperature of about 100° C. for 1 hour and the catalyst filtered off. There were recovered 17 parts of relatively dry catalyst cake.

Example V was again repeated with the exception that 18.8 parts of the original catalyst were replaced by 17 parts of the diisobutylene treated catalyst. There were obtained 190 parts of diisobutyl phenol distilling over the range of 163° to 182° C. at 15 mm. pressure and having an S.P. of 62°. The yield was 92%.

B. Example V (A) was repeated in full, except that for the regeneration of the catalyst as recovered from repetition 5, the catalyst cake was slurried in 300 parts of 1-octadecene at about 150° C. for 2 hours. There were recovered 18 parts of relatively dry catalyst cake.

As in the several repetitions described under Example V (A), the yield of diisobutylphenol progressively diminished, dropping to a yield of 73%. Under repetition of the alkylation with the 1-octadecene-treated catalyst, there were obtained 186 parts of diisobutylphenol distilling over the range of 163° to 182° C. at 15 mm. pressure. Yield was 90%.

*Example VI*

Into a 1-liter 3-necked flask equipped with agitator, thermometer and condenser were charged 188 parts of U.S.P. phenol (2 moles), 168 parts of dipropylene (2 moles) and 18.8 parts of acid clay catalyst obtained under the brand name of "Houdry Alkylation Catalyst." The mixture was heated at 95° C. with agitation for a period of 4 hours. The catalyst was removed by filtration and amounted to 27 parts as a wet filter cake. The filtrate was fractionated at 10 mm. pressure through a laboratory Vigreaux column providing 17 theoretical plates to yield 160 parts of dipropyl phenol distilling over the range of 138° to 147° C. at 10 mm. pressure and having a refractive index $n_D^{25}$ of 1.5174. The yield was 90%.

The catalyst cake recovered in the manner stated above was employed in five successive repetitions of the alkylation procedure of Example VI, employing in each repetition 188 parts of U.S.P. phenol and 168 parts of dipropylene, the catalyst employed in each case being that recovered in the preceding repetition. The results of the five repetitions are as follows:

| Repetition | Parts of wet filter cake catalyst | Parts of dipropyl phenol | Percent yield |
| --- | --- | --- | --- |
| 1 | 27 | 153 | 86 |
| 2 | 26 | 148 | 83 |
| 3 | 25 | 142 | 80 |
| 4 | 24 | 133 | 75 |
| 5 | 23 | 128 | 73 |

The catalyst cake as recovered by filtration from repetition 5 of Example VI was slurried in 200 parts of 1-decene and the slurry heated at a temperature of 100° C. for 2 hours and the catalyst filtered off. There were recovered 17.5 parts of substantially dry catalyst cake.

Example VI was again repeated with the exception that the 18.8 parts of original catalyst were replaced by 17.5 parts of the decene-treated catalyst. There were obtained 160 parts of dipropyl phenol distilling over the range of 138° to 147° C. at 10 mm. pressure and of refractive index $n_D^{25}$ 1.5174. The yield was 90%.

While the foregoing examples have been directed to the regeneration of the used or spent catalyst, our invention also provides for a method of maintaining the catalyst activity by introducing any one of the foregoing regenerating olefins to the alkylation reaction mixture at or near the completion thereof and continuing the reaction for an additional period of time ranging from 10 to 20 minutes. By such introduction into each and every run, the initial high catalyst activity is prolonged for many runs while maintaining production of the alkylated phenol in good yields and of high quality.

The following examples will show the advantage of maintaining good yields without the need of intermittent regeneration.

*Example VII*

A. Into a 1-liter, 3-necked flask equipped with agitator, thermometer and condenser were charged:

| | Parts |
| --- | --- |
| Phenol USP (2.0 M) | 188 |
| 1-nonene (1.0 M) | 126 |
| Catalyst KSF | 18.8 |

The mixture was heated at 70° C. with agitation for a period of 5 hours. Then 125 parts of 1-nonene were added through the condenser and the reaction mixture permitted to reflux for 15 minutes. The catalyst was then removed by filtration. After removal of the nonene at 148° C. and atmospheric pressure, the filtrate was fractionated at 10 mm. pressure through a laboratory Vigreaux column providing 17 theoretical plates to yield 208 parts nonylphenol distilling over the range 159 to 181° C. and refractive index $n_D^{25}$ of 1.5110. The yield was 94%.

B. Operation A was repeated with the exception that instead of the 18.8 parts of catalyst KSF there were used 24 parts of cake as recovered by filtration in operation A, said cake comprising once-used-catalyst and other residual materials from the reaction mixture. There were obtained 208 parts of nonylphenol distilling over the range 159 to 181°/10 mm. pressure and refractive index $n_D^{25}$ of 1.5110. The yield was 94.5%.

C. Operation A was repeated with the exception that instead of the 18.8 parts of catalyst KSF there were used 23.5 parts of cake as recovered by filtration in operation B, said cake comprising twice-used-catalyst and other residual materials from the reaction mixture. There were obtained 208 parts of nonylphenol distilling over the range 159 to 181°/10 mm. pressure and refractive index $n_D^{25}$ of 1.5110. The yield was 94.5%.

D. Operation A was repeated with the exception that instead of the 18.8 parts of catalyst KSF there were used 23 parts of cake as recovered by filtration in operation C, said cake comprising three-times-used-catalyst and other residual materials from the reaction mixture. There were obtained 210 parts of nonylphenol distilling over the range 159 to 181°/10 mm. pressure and refractive index $n_D^{25}$ of 1.5110. The yield was 95.4%.

E. Operation A was repeated with the exception that instead of the 18.8 parts of catalyst KSF there were used 22.6 parts of cake as recovered by filtration in operation D, said cake comprising four-times-used catalyst and other residual materials from the reaction mixture. There were obtained 207 parts of nonylphenol distilling over the range 159 to 181°/10 mm. pressure and refractive index $n_D^{25}$ of 1.5110. The yield was 94.0%.

F. Operation A was repeated with the exception that instead of the 18.8 parts of catalyst KSF there were used 22.1 parts of cake as recovered by filtration in operation E, said cake comprising five-times-used catalyst and other residual materials from the reaction mixture. There were obtained 208.5 parts of nonylphenol distilling over the range 159 to 181°/10 mm. pressure and refractive index $n_D^{25}$ of 1.5110. The yield was 94.7%.

G. Operation A was again repeated with the exception that instead of the 18.8 parts of catalyst KSF there were used 21.7 parts of cake as recovered by filtration in operation F, said cake comprising six-times-used catalyst and other residual materials from the reaction mixture. There were obtained 207.5 parts of nonylphenol distilling over the range 159 to 181°/10 mm. pressure and of refractive index $n_D^{25}$ of 1.5110. Yield was 94.4%.

*Example VIII*

A. Into a 1-liter, 3-necked flask equipped with agitator, thermometer and condenser was charged:

| | Parts |
|---|---|
| Phenol USP (2.5 M) | 235 |
| 1-dodecene (0.5 M) | 84 |
| Catalyst KSF | 23.5 |

The mixture was heated at 90° C. with agitation for a period of 5 hours. Then 80 parts of 1-hexene were added through the condenser and the reaction mixture was permitted to reflux for 15 minutes. The catalyst was removed by filtration. After removal of the hexene at 70° C. and atmospheric pressure, the filtrate was fractioned at 10 mm. pressure through a laboratory Vigreaux column providing 17 theoretical plates to yield 26 parts of dodecylphenol distilling over the range 178 to 20° C. at 10 mm. and having a refractive index $n_D^{25}$ of 1.5070. The yield was 92.5%.

B. Operation A was repeated with the exception that instead of the 23.5 parts of catalyst KSF there were used 32 parts of cake as recovered by filtration in operation A, said cake comprising once-used-catalyst and other residual materials from the reaction mixture. There were obtained 242 parts of dodecylphenol distilling over the range 178–220° C./10 mm. pressure, and refractive index $n_D^{25}$ of 1.5070. The yield was 92%.

C. Operation A was repeated with the exception that instead of the 23.5 parts of catalyst KSF there were used 31.5 parts of cake as recovered by filtration in operation B, said cake comprising twice-used-catalyst and other residual materials from the reaction mixture. There were obtained 243 parts of dodecylphenol distilling over the range 178–220° C./10 mm. pressure, and refractive index $n_D^{25}$ of 1.5070. The yield was 92.5%.

D. Operation A was repeated with the exception that instead of the 23.5 parts of catalyst KSF there were used 29.8 parts of cake as recovered by filtration in operation C, said cake comprises three-times-used catalyst and other residual materials from the reaction mixture. There were obtained 243 parts of dodecylphenol distilling over the range 178–220° C./10 mm. pressure, and refractive index $n_D^{25}$ of 1.5070. The yield was 92%.

E. Operation A was repeated with the exception that instead of the 23.5 parts of catalyst KSF there was used 29.9 parts of cake as recovered by filtration in operation D, said cake comprising four-times-used catalyst and other residual materials from the reaction mixture. There were obtained 244 parts of dodecylphenol distilling over the range 178–220° C./10 mm. pressure, and refractive index $n_D^{25}$ of 1.5070. The yield was 93%.

F. Operation A was repeated with the exception that instead of the 23.5 parts of catalyst KSF there were used 28.9 parts of cake as recovered by filtration in operation E, said cake comprising five-times-used catalyst and other residual materials from the reaction mixture. There were obtained 237 parts of dodecylphenol distilling over the range 178–220° C./10 mm. pressure, and refractive index $n_D^{25}$ of 1.5070. The yield was 91%.

G. Operation A was again repeated with the exception that instead of the 23.5 parts of catalyst KSF there were used 28.6 parts of cake as recovered by filtration in operation F, said cake comprising six-times-used catalyst and other residual materials from the reaction mixture. There were obtained 242 parts of dodecylphenol distilling over the range 178–220° C./10 mm. pressure, and refractive index $n_D^{25}$ of 1.5070. The yield was 92%.

*Example IX*

Into a 1-liter, 3-necked flask equipped with agitator, thermometer, and condenser were charged 540 parts U.S.P. cresol (5 moles), 175 parts pentaeicosene (0.5 mole), and 32.4 parts acid clay catalyst obtained under the brand name "Harshaw Silica Catalyst." The mixture was heated at 90° C. with agitation for a period of 5 hours. Then 200 parts nonene were added through the condenser and the reaction mixture was allowed to reflux for 15 minutes. The catalyst was removed by filtration, nonene was removed under reduced pressure, and the product, pentaeicosylphenol was fractionally distilled under a pressure of 12 microns mercury. Yield: 330 grams (75%).

The above operation was repeated three times, except that in each instance the catalyst used was that isolated as above from the preceding preparation. The yields ranged from 76 to 70%.

We claim:

1. A method of maintaining and regenerating the activity of an aluminum hydosilicate clay catalyst used in the alkylation of a phenolic compound with an olefinic hydrocarbon which comprises contacting 1 part by weight of said catalyst with 1 to 100 parts by weight of an olefinic hydrocarbon of from 3 to 25 carbon atoms at a temperature ranging from ambient to 200° C. for a period of time sufficient to restore said catalyst to activity.

2. A method of regenerating an acid activated montmorillonite clay catalyst which has been used in the alkylation of a phenolic compound with an olefinic hydrocarbon which comprises contacting 1 part by weight of said used catalyst with 1 to 100 parts by weight of an olefinic hydrocarbon of from 3 to 25 carbon atoms at a temperature ranging from ambient to 200° C. for a period of time sufficient to restore said catalyst to activity.

3. A method of maintaining the activity of an acid activated montmorillonite clay catalyst employed in the alkylation of a phenolic compound with an olefinic hydrocarbon which comprises contacting 1 part by weight of said catalyst near the completion of said alkylation with 1 to 100 parts by weight of an olefinic hydrocarbon of from 3 to 25 carbon atoms at a temperature ranging from ambient to 200° C. for a period of time sufficient to restore said catalyst to activity.

4. A method according to claim 1 wherein the olefinic hydrocarbon is hexene.

5. A method according to claim 1 wherein the olefinic hydrocarbon is diisobutylene.

6. A method according to claim 1 wherein the olefinic hydrocarbon is nonene.

7. A method according to claim 1 wherein the olefinic hydrocarbon is dodecene.

8. A method according to claim 1 wherein the olefinic hydrocarbon is octadecene.

9. A method according to claim 1 wherein the olefinic hydrocarbon is pentacosene.

References Cited by the Examiner

UNITED STATES PATENTS

| | | | |
|---|---|---|---|
| 2,784,238 | 3/57 | Jacobs | 252—414 X |
| 2,891,935 | 6/59 | Lanning | 252—414 X |

MAURICE A. BRINDISI, *Primary Examiner.*